United States Patent
Brothers et al.

(10) Patent No.: US 7,201,798 B2
(45) Date of Patent: Apr. 10, 2007

(54) SET-DELAYED CEMENT COMPOSITIONS COMPRISING HYDRATED LIME AND SILICA AND METHODS OF CEMENTING IN SUBTERRANEAN FORMATIONS

(75) Inventors: Lance E. Brothers, Chickasha, OK (US); Anthony V. Palmer, Ardmore, OK (US); Robert J. Sepulvado, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/122,438

(22) Filed: May 5, 2005

(65) Prior Publication Data

US 2006/0249054 A1   Nov. 9, 2006

(51) Int. Cl.
*C04B 28/18* (2006.01)
*C09K 8/467* (2006.01)
*C09K 8/42* (2006.01)

(52) U.S. Cl. ............... 106/795; 106/792; 106/796
(58) Field of Classification Search ............ 106/795, 106/796, 792
See application file for complete search history.

(56) References Cited

U.S. PATENT DOCUMENTS

| | | | |
|---|---|---|---|
| 2,698,256 A | 12/1954 | Shea, Jr. et al. | 106/308 |
| 2,805,719 A | 9/1957 | Anderson | 166/29 |
| 3,679,446 A | 7/1972 | Kubo | 106/120 |
| 4,234,344 A | 11/1980 | Tinsley et al. | 106/88 |
| 4,238,536 A | 12/1980 | Koch et al. | 427/421 |
| 4,515,635 A | 5/1985 | Rao et al. | 106/90 |
| 4,555,269 A | 11/1985 | Rao et al. | 106/90 |
| 4,676,317 A | 6/1987 | Fry et al. | 166/293 |
| 4,818,288 A | 4/1989 | Aignesberger et al. | 106/90 |
| 4,880,468 A | 11/1989 | Bowlin et al. | 206/98 |
| 4,935,060 A | 6/1990 | Dingsoyr | 106/719 |
| 4,941,536 A | 7/1990 | Brothers et al. | 166/293 |
| 5,049,288 A | 9/1991 | Brothers et al. | 252/8.551 |
| 5,295,543 A | 3/1994 | Terry et al. | 166/293 |
| 5,327,968 A | 7/1994 | Onan et al. | 166/293 |
| 5,332,041 A | 7/1994 | Onan et al. | 166/295 |
| 5,336,022 A | 8/1994 | McKennon et al. | 405/263 |
| 5,346,550 A | 9/1994 | Kunzi et al. | 106/709 |
| 5,383,521 A | 1/1995 | Onan et al. | 166/293 |
| 5,447,198 A | 9/1995 | Kunzi et al. | 166/293 |
| 5,472,051 A | 12/1995 | Brothers et al. | 166/293 |
| 5,577,865 A | 11/1996 | Manrique et al. | 405/266 |
| 5,711,383 A | 1/1998 | Terry et al. | 175/72 |
| 6,068,055 A | 5/2000 | Chatterji et al. | 166/293 |
| 6,138,759 A | 10/2000 | Chatterji et al. | 166/293 |
| 6,143,069 A | 11/2000 | Brothers et al. | 106/678 |
| 6,231,664 B1 | 5/2001 | Chatterji et al. | 106/724 |
| 6,315,042 B1 | 11/2001 | Griffith et al. | 166/291 |
| 6,332,921 B1 | 12/2001 | Brothers et al. | 106/692 |
| 6,346,146 B1 * | 2/2002 | Duselis et al. | 106/713 |
| 6,488,763 B2 | 12/2002 | Brothers et al. | 106/692 |
| 6,502,636 B2 | 1/2003 | Chatterji et al. | 166/293 |
| 6,524,384 B2 | 2/2003 | Griffith et al. | 106/705 |
| 6,562,122 B2 | 5/2003 | Dao et al. | 106/705 |
| 6,666,268 B2 | 12/2003 | Griffith et al. | 166/292 |
| 6,668,929 B2 | 12/2003 | Griffith et al. | 166/292 |
| 6,689,208 B1 | 2/2004 | Brothers et al. | 106/794 |
| 6,716,282 B2 | 4/2004 | Griffith et al. | 106/705 |
| 6,776,237 B2 | 8/2004 | Dao et al. | 166/292 |
| 6,796,378 B2 | 9/2004 | Reddy et al. | 166/293 |
| 6,846,357 B2 | 1/2005 | Reddy et al. | 106/692 |
| 6,908,508 B2 * | 6/2005 | Brothers | 106/794 |

FOREIGN PATENT DOCUMENTS

| | | |
|---|---|---|
| DE | 19918598 A1 * | 1/2000 |
| EP | 0 177 308 A2 | 4/1986 |
| EP | 0 605 257 A1 | 7/1994 |
| EP | 0 704 410 A2 | 4/1996 |
| JP | 3-42096 A * | 2/1991 |
| JP | 07-196355 A * | 1/1995 |
| SU | 1080911 A * | 3/1984 |

OTHER PUBLICATIONS

Halliburton brochure entitled "Hi-Dense® Weight Additives" dated 1998.
Halliburton brochure entitled "HR®-5 Cement Additive" dated 1998.
Halliburton brochure entitled "HR®-25 Cement Retarder" dated 1999.
Halliburton brochure entitled "SCR-100 Cement Retarder" dated 1999.
Halliburton brochure entitled "SSA-1 Strength-Stablizing Agent" dated 1998.
Halliburton brochure entitled "SSA-2 Coarse Silica Flour" dated 1999.
Patent application entitled "Set-Delayed Cement Compositions Comprising Hydrated Lime and Silica and Methods of Cementing In Subterranean Formations" by Lance E. Brothers et al., filed May 5, 2005 as U.S. Appl. No. 11/122,436.
Foreign communication from a related counterpart application dated Jul. 19, 2006.
Foreign communication from a related counterpart application dated Aug. 3, 2006.

* cited by examiner

*Primary Examiner*—Anthony J. Green
(74) *Attorney, Agent, or Firm*—Craig W. Roddy; Baker Botts, L.L.P.

(57) ABSTRACT

Cement compositions for use in subterranean formations are provided. An example of a cement composition is a cement composition comprising: water, a cementitious component consisting essentially of: hydrated lime, and silica; and a dispersant. Another example of a cement composition is a cement composition comprising: water, a cementitious component consisting essentially of: hydrated lime, and silica; and a set retarder. Another example of a cement composition is a cement composition comprising: water, a cementitious component consisting essentially of: hydrated lime, and silica; and a fluid loss control additive.

5 Claims, No Drawings

SET-DELAYED CEMENT COMPOSITIONS COMPRISING HYDRATED LIME AND SILICA AND METHODS OF CEMENTING IN SUBTERRANEAN FORMATIONS

BACKGROUND

The present invention relates to subterranean operations, and more particularly, to set-delayed cement compositions and methods of using such cement compositions in subterranean applications.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

A broad variety of cement compositions have been used in conventional subterranean cementing operations, including, inter alia, cement compositions comprising Portland cement, and cement compositions comprising water, fly ash, and lime. However, the composition and quality of both Portland cement and fly ash vary widely. Accordingly, the set times of conventional cement compositions employing Portland cement and/or fly ash may be unpredictable. This may be problematic because, inter alia, it may cause such conventional cement compositions to set prematurely, before they have been properly placed in a desired location in a subterranean formation.

SUMMARY

The present invention relates to subterranean operations, and more particularly, to set-delayed cement compositions and methods of using such cement compositions in subterranean applications.

An example of a cement composition of the present invention is a cement composition comprising: water; a cementitious component consisting essentially of: hydrated lime, and silica; and a dispersant.

Another example of a cement composition of the present invention is a cement composition comprising: water; a cementitious component consisting essentially of: hydrated lime, and silica; and a set retarder.

Another example of a cement composition of the present invention is a cement composition comprising: water; a cementitious component consisting essentially of: hydrated lime, and silica; and a fluid loss control additive.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean operations, and more particularly, to set-delayed cement compositions and methods of using such cement compositions in subterranean applications.

The set-delayed cement compositions of the present invention generally comprise water and a cementitious component consisting essentially of: hydrated lime and silica. Among other things, the set-delayed cement compositions of the present invention may demonstrate better repeatability and reproducibility than conventional cement compositions that may comprise, inter alia, cementitious components comprising Portland cements and/or fly ash. Portland cements and fly ashes often vary significantly in their chemical composition, due in part to the process by which Portland cements and fly ashes are made. Accordingly, conventional cement compositions comprising cementitious components that comprise Portland cements and/or fly ashes often will demonstrate undesirable variability in their performance. In contrast, the chemical composition of hydrated lime and silica demonstrates far less variability, and in certain embodiments, may approach a degree of repeatability comparable to that of chemical-grade reagents. Accordingly, the set-delayed cement compositions of the present invention, comprising a cementitious component that consists essentially of hydrated lime and silica, may demonstrate desirable repeatability and reproducibility, particularly as compared to conventional cement compositions. Moreover, cementitious components consisting essentially of hydrated lime and silica may be less reactive than cementitious components comprising Portland cements. Accordingly, certain embodiments of the set-delayed cement compositions of the present invention, comprising cementitious components consisting essentially of hydrated lime and silica, may be particularly suitable for use, inter alia, in subterranean formations having relatively high bottom-hole-circulating temperatures, e.g., temperatures in the range of from about 400° F. to about 500° F. In certain optional embodiments, the set-delayed cement compositions of the present invention optionally may comprise other additives suitable for use in the set-delayed cement compositions may be added, such as set retarders, fluid loss control agents, dispersants, and the like.

The water present in the set-delayed cement compositions of the present invention may be from any source, provided that it does not contain an excess of compounds that adversely affect other compounds in the set-delayed cement compositions. For example, a set-delayed cement composition of the present invention can comprise fresh water, salt water (e.g., water containing one or more salts dissolved therein), brine (e.g., saturated salt water), or seawater. The water may be present in an amount sufficient to produce a pumpable slurry. Generally, the water is present in the set-delayed cement compositions of the present invention in an amount in the range of from about 20% to about 80% by weight of the cementitious component. In certain exemplary embodiments, the water is present in the set-delayed cement compositions in an amount in the range of from about 35% to about 45% by weight of the cementitious component.

The set-delayed cement compositions of the present invention comprise hydrated lime. As referred to herein, hydrated lime will be understood to mean calcium hydroxide. The hydrated lime may be present in the set-delayed cement compositions in an amount in the range of from about 1% to about 40% by weight of the cementitious component. In certain embodiments, the hydrated lime may be present in the set-delayed cement compositions in an amount in the range of from about 5% to about 20% by weight of the cementitious component. An example of a suitable hydrated lime is commercially available from Continental Lime, Inc., of Salt Lake City, Utah.

The silica present in the set-delayed cement compositions of the present invention comprises ground quartz. Examples of suitable silicas include those that are commercially available from Halliburton Energy Services, Inc., of Duncan, Okla., under the trade names "SSA-1" and "SSA-2." The silica may be present in the set-delayed cement compositions in an amount in the range of from about 60% to about 99% by weight of the cementitious component. In certain embodiments, the silica is present in the set-delayed cement compositions in an amount in the range of from about 80% to about 95% by weight of the cementitious component.

Optionally, the set-delayed cement compositions of the present invention further may comprise a set retarder. Whether a particular application will require the inclusion of a set retarder in a particular set-delayed cement composition may depend upon factors including, but not limited to, the bottom hole circulating temperature of the application. One of ordinary skill in the art, with the benefit of this disclosure, will be able to determine whether a set retarder is appropriate for a particular application. Generally, any set retarder may be used with the set-delayed cement compositions of the present invention. Examples of suitable set retarders include those that are commercially available from Halliburton Energy Services, Inc., of Duncan, Okla., under the trade names SCR-100, HR®-5, and HR®-25. Where included, the optional set retarder may be present in the set-delayed cement compositions in an amount in the range of from about 0.05% to about 2.5% by weight of the cementitious component. In higher-temperature applications, the optional set retarder may be present in the set-delayed cement compositions in an amount in the range of from about 1.5% to about 2.5% by weight of the cementitious component.

Optionally, the set-delayed cement compositions of the present invention may further comprise a weighting agent. Generally, any weighting agent may be used with the set-delayed cement compositions of the present invention. In certain embodiments, the weighting agents used in the present invention comprise hematites. An example of a suitable hematite is commercially available under the trade name "Hi-Dense® No. 4" from Halliburton Energy Services, Inc., of Duncan, Okla. In certain embodiments of the present invention where a weighting agent may be present in a set-delayed cement composition, the weighting agent may be present in an amount in the range of from about 5% to about 45% by weight of the cementitious component. In certain embodiments, the weighting agent may be present in an amount in the range of from about 35% to about 45% by weight of the cementitious component.

Additional additives optionally may be added to the set-delayed cement compositions of the present invention as deemed appropriate by one skilled in the art with the benefit of this disclosure. Examples of such additives include, among other things, fluid loss control additives, defoamers, microspheres, dispersants, salts, and formation conditioning agents, and the like. Where included, a dispersant may be present in the set-delayed cement compositions of the present invention in an amount in the range of from about 0.1% to about 1.0% by weight of the cementitious component. An example of a suitable dispersant is a sulfonated acetone formaldehyde condensate that is commercially available from Halliburton Energy Services, Inc., of Duncan, Okla., under the trade name CFR-3. Where included, a fluid loss control additive may be present in the set-delayed cement compositions of the present invention in an amount in the range of from about 0.1% to about 1.0% by weight of the cementitious component. Examples of suitable fluid loss control additives are commercially available from Halliburton Energy Services, Inc., of Duncan, Okla., under the trade names HALAD® 344 and HALAD® 413.

In one embodiment of the present invention, a set-delayed cement composition of the present invention may be provided that comprises water and a cementitious component consisting essentially of silica and hydrated lime. The set-delayed cement composition may be placed in a subterranean formation and permitted to set therein.

In another embodiment of the present invention, a set-delayed cement composition of the present invention may be provided that comprises water, and a cementitious component consisting essentially of: silica, and hydrated lime. In certain embodiments, the set-delayed cement composition further may comprise a dispersant. The set-delayed cement composition may be permitted to remain in storage for a desired time period (e.g., a time period in the range of from about 12 hours to about seven days after the date on which the set-delayed cement composition was provided), after which a set-retarder may be added to the set-delayed cement composition, and the mixture of the set-delayed cement composition plus retarder may be placed in a subterranean formation and permitted to set therein.

In another embodiment of the present invention, a set-delayed cement composition of the present invention may be provided that comprises water, a set retarder, and a cementitious component consisting essentially of: silica and hydrated lime. The set-delayed cement composition may be permitted to remain in storage for a time period in the range of from about 5 minutes to about 24 hours, after which the set-delayed cement composition may be placed in a subterranean formation and permitted to set therein.

In one embodiment, a set-delayed cement composition of the present invention may comprise about 25% by weight water, 12% by weight hydrated lime, 20% by weight micro silica, 20% by weight silica flour, 20% by weight SSA-2, 2% by weight bentonite, 0.7% by weight SCR-100.

To facilitate a better understanding of the present invention, the following examples of certain aspects of some embodiments are given. In no way should the following examples be read to limit, or define, the entire scope of the invention.

EXAMPLE 1

Sample set-delayed cement compositions of the present invention were prepared comprising 250 grams of water, 120 grams of hydrated lime, 200 grams of micro silica, 200 grams of silica flour, 200 grams of SSA-2, 21.6 grams of bentonite, and 7.2 grams of SCR-100. The sample compositions (referred to herein as Sample Composition No. 1 and Sample Composition No. 2) were prepared at room temperature and subjected to a thickening time test at 250° F., either immediately after mixing or after standing at room temperature for 24 hours after mixing. The thickening test was performed in accordance with API Spec 10. As a comparison, a conventional cement composition was prepared comprising class H cement blended with 1% SCR-100 and 38% water. After mixing, the conventional cement composition was left standing overnight and then subjected to the same thickening time test described above.

Sample Composition No. 1 was tested immediately after mixing and had a thickening time of 2:48. Sample Composition No. 2 was tested after standing for 24 hours, and had a thickening time of 2:32. The conventional cement composition was semi-set and could not be re-blended after 24 hours.

The above example demonstrates, among other things, that the set-delayed cement compositions of the present invention are suitable for use in subterranean applications.

EXAMPLE 2

Additional sample cement compositions were prepared as follows. About 600 grams of SSA-1 were added to 60 grams of lime and 231 grams of water. Varying amounts of set retarder were added, and thickening tests were conducted on the sample cement compositions at varying test temperatures. The thickening tests were conducted according to API Spec 10B.

Sample Composition No. 3 comprised 600 grams SSA-1, 60 grams lime, 231 grams of water, and 0.5% HR®-5 by weight of the mixture of lime and silica.

Sample Composition No. 4 comprised 600 grams SSA-1, 60 grams lime, 231 grams of water, and 0.6% HR®-5 by weight of the mixture of lime and silica.

Sample Composition No. 5 comprised 600 grams SSA-1, 60 grams lime, 231 grams of water, and 1.0% HR®-5 by weight of the mixture of lime and silica.

Sample Composition No. 6 comprised 600 grams SSA-1, 60 grams lime, 231 grams of water, and 0.6% HR®-5 by weight of the mixture of lime and silica.

Sample Composition No. 7 comprised 600 grams SSA-1, 60 grams lime, 231 grams of water, and 0.7% HR®-5 by weight of the mixture of lime and silica.

Sample Composition No. 8 comprised 600 grams SSA-1, 60 grams lime, 231 grams of water, 1.0% HR®-5 by weight of the mixture of lime and silica, and 0.5% HR®-25 by weight of the mixture of lime and silica.

Sample Composition No. 9 comprised 600 grams SSA-1, 60 grams lime, 231 grams of water, 2.0% HR®-5 by weight of the mixture of lime and silica, and 1.0% HR®-25 by weight of the mixture of lime and silica.

Sample Composition No. 10 comprised 600 grams SSA-1, 60 grams lime, 231 grams of water, 2.0% HR®-5 by weight of the mixture of lime and silica, and 1.0% HR®-25 by weight of the mixture of lime and silica.

The results of the thickening time are set forth in Table 1 below.

TABLE 1

| Sample Composition | HR-5 | HR-25 | Temperature (° F.) | Thickening Time (Hr:Min) |
| --- | --- | --- | --- | --- |
| Sample Composition No. 3 | 0.5% | 0% | 400 | 2:02 |
| Sample Composition No. 4 | 0.6% | 0% | 400 | 5:39 |
| Sample Composition No. 5 | 1.0% | 0% | 400 | >7:15 |
| Sample Composition No. 6 | 0.6% | 0% | 450 | 2:30 |
| Sample Composition No. 7 | 0.7% | 0% | 450 | 4:45 |
| Sample Composition No. 8 | 1.0% | 0.5% | 400 | >6:00 |
| Sample Composition No. 9 | 2.0% | 1.0% | 450 | >6:00 |
| Sample Composition No. 10 | 2.0% | 1.0% | 500 | >6:00 |

The above example demonstrates, among other things, that the set-delayed cement compositions of the present invention are suitable for use in subterranean applications.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A cement composition consisting essentially of: water; a cementitious component consisting essentially of: hydrated lime, and ground quartz; and a dispersant comprising a sulfonated acetone formaldehyde condensate.

2. The cement composition of claim 1 wherein the dispersant is present in the cement composition in an amount in the range of from about 0.1% to about 1.0% by weight of the cementitious component.

3. The cement composition of claim 1 wherein the hydrated lime is present in the cement composition in an amount in the range of from about 1% to about 40% by weight of the cementitious component.

4. The cement composition of claim 1 wherein the ground quartz is present in the cement composition in an amount in the range of from about 60% to about 99% by weight of the cementitious component.

5. The cement composition of claim 1 wherein the water is present in the cement composition in an amount in the range of from about 20% to about 80% by weight of the cementitious component.

* * * * *